United States Patent
Sonesh et al.

(10) Patent No.: US 6,614,783 B1
(45) Date of Patent: *Sep. 2, 2003

(54) MULTIMEDIA TELECOMMUNICATION AUTOMATIC CALL DISTRIBUTION SYSTEM USING INTERNET/PSTN CALL ROUTING

(75) Inventors: Ari Sonesh, Dix Hills, NY (US); Stephen Dellutri, Syosset, NY (US)

(73) Assignee: Cosmocom, Inc., Melville, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/457,704

(22) Filed: Dec. 10, 1999

Related U.S. Application Data

(63) Continuation of application No. 08/825,635, filed on Apr. 1, 1997, now Pat. No. 6,046,762.

(51) Int. Cl.[7] .............................................. H04L 12/66
(52) U.S. Cl. ...................... 370/352; 370/401; 370/412; 379/88.17; 379/266.01
(58) Field of Search ........................ 370/352, 354–356, 370/400, 401, 412, 389, 230, 524, 496, 349; 348/16; 725/25; 379/88.17, 93.17, 88.18, 266.01; 709/230, 229, 202, 277, 219, 228; 345/709; 705/52

(56) References Cited

U.S. PATENT DOCUMENTS

| | | | |
|---|---|---|---|
| 5,406,557 A | 4/1995 | Baudoin | 370/407 |
| 5,450,123 A | 9/1995 | Smith | 348/14.12 |
| 5,519,772 A | 5/1996 | Akman et al. | 379/265 |
| 5,537,436 A | 7/1996 | Bottoms et al. | 375/222 |
| 5,563,937 A | 10/1996 | Bruno et al. | 379/201 |
| 5,742,675 A | 4/1998 | Kilander et al. | 379/265 |
| 5,822,306 A | 10/1998 | Catchpole | 370/261 |
| 5,867,494 A * | 2/1999 | Krishnaswamy et al. | 370/352 |
| 5,867,495 A | 2/1999 | Elliott et al. | 370/352 |
| 5,878,130 A | 3/1999 | Andrews et al. | 379/265 |
| 5,884,032 A | 3/1999 | Bateman et al. | 709/204 |
| 5,991,292 A | 11/1999 | Focsaneanu et al. | 370/352 |
| 6,026,087 A * | 2/2000 | Mirashrafi et al. | 370/389 |
| 6,046,762 A * | 4/2000 | Sonesh et al. | 348/16 |
| 6,069,890 A | 5/2000 | White et al. | 370/352 |

* cited by examiner

*Primary Examiner*—Hassan Kizou
*Assistant Examiner*—John Pezzlo
(74) *Attorney, Agent, or Firm*—Dilworth & Barrese, LLP

(57) ABSTRACT

A multimedia telecommunication automatic call distribution center which allows access to the call center via a plurality of access means, including telephone and data networks to provide simultaneous voice, data, and video access, and ensures effective transparent spreading of agents over different geographical locations. The automatic call distribution center of the present invention uses a multimedia automatic call distribution server acting as connection manager for data network callers and provides for automatic caller identification.

25 Claims, 7 Drawing Sheets

DISTRIBUTED CALL CENTER

ACCESS FROM INTERNET METHOD

MULTIMEDIA TELECOMMUNICATION AUTOMATIC CALL DISTRIBUTION SYSTEM USING INTERNET/PSTN CALL ROUTING

CONTINUING DATA

This application is a continuation of Ser. No. 08/825,635 filed Apr. 1, 1997, now U.S. Pat. No. 6,046,762.

BACKGROUND OF THE INVENTION

1. Field of the Invention

This invention relates to the field of multimedia telephony switching and routing. More specifically, the invention relates to telephone automatic call distribution ("ACD") for call centers, and in particular to geographically distributed multimedia automatic call distribution systems ("MMACD") connected to a plurality of voice and data networks.

2. Background of Related Art

A call center is a business unit that uses groups of agents or telephone representatives to conduct specific transactions with calling customers. The opportunity to establish a call center exists anywhere where more than one person answers the same or similar types of calls.

In this competitive world companies need an advantage. Whether a business is large or small, call center automation provides an advantage anywhere where a business relies heavily on telephone transactions. Call centers provide a business advantage by getting an edge on competition through increased customer satisfaction, increased productivity and revenues, and reduced operating costs.

The instant invention ensures that companies will have a competitive advantage by solving the problem of providing a multimedia telecommunication ACD system which: allows access to the call center via a plurality of access mean, including telephone networks and data networks, ensures effective transparent spreading of agents over different geographical locations, acts as a connection manager for callers, and provides for automatic caller identification.

Business applications for call centers are virtually unlimited in the types of transactions that the can accommodate. Call centers can support, for example, sales, including order entry, order inquiry, and reservations; financial services, including funds transfer credit card verification, and stock transactions; information services, including event schedules, referral services, transportation schedules, and yellow pages; customer services, including technical support, repair dispatch, and claims handling.

Despite the almost innumerable applications, however, existing ACD centers have several limitations.

One notable drawback to ACDs is that they lack intelligence. In other words, limited inflexible intelligence is built into the ACD software. Routing and re-routing of inbound and outbound calls is based on circuit switching. Furthermore, existing ACD centers cannot be accessed through a plurality of access means, such as voice, data, and video. To maximize existing resources and to take advantage of the latest technology, ACD manufacturers are trying to open their systems to third-party inbound and outbound call management systems by integrating, via the recently introduced Computer Telephony Integration ("CTI") standards, the Telephony Application Programming Interface ("TAPI"), the Telephony Services Application Programming Interface ("TSAPI"), and other proprietary protocols. These third-party inbound and outbound call management systems apply computer control and functionality to telephones. Adding computer intelligence to unintelligent telephone devices provides users with more information about inbound calls and lets them use telephones more effectively to distribute information by providing not only customer records coincident with inbound and outbound phone calls, but also skill-based call routing matching agent skills with caller needs and virtual, or geographically distributed, call centers.

Yet another drawback of the present technology, which integrates traditional telephone switching technology utilizing circuit switching with information systems, i.e. computers, is that it does not provide a cost-effective solution for the integration of telephone calls with computers. Additionally, the present systems do not effectively address the need for ACDs to be able to transparently spread agents over different locations. Moreover, present state of the art systems do not address at all the emerging multimedia communication standards such as simultaneous voice, data, and video telephony access to the center.

One recent trend in the ACD industry is to enable call agents to be more efficient, productive and to ultimately provide the best service to the customer during the first contact. Technologies such as Automatic Number Identification,("ANI") where the caller phone number is passed to the agent, give agents the opportunity to access information about the caller from corporate databases. The latest CTI technologies play a major role in helping companies respond to industry trends and experience increased productivity and customer service goals by integrating traditional ACDs with computers.

In parallel to the development of ACDs, there are Internet Customer Service Centers ("ICSCs") under development. These applications provide for access to a World Wide Web ("WWW") site, where information pertaining to customer service, such as order status or tips for problem resolution, can be easily obtained. The user of the ICSC uses a WWW browser to search for the requested information. The user may obtain information in the form of text, voice or video. Further, the user may download information to computer data files. Live transfer to a customer service representative is not possible. Examples of patents covering various aspects of communication via data and telecommunication networks are described below.

U.S. Pat. No. 5,533,115 to Hollenbach et al. discloses an advanced ACD for providing information to callers through the Public Switch Telephone Network ("PSTN"). An incoming call from a customer passes through the PSTN to an intelligent peripheral, a service control point, and an ACD. In many cases, the caller is prompted in queue to provide some information, such as the caller's phone number or account number. This information is used to access data records stored in a database which are presented to an agent at an agent terminal. The agent station has access to external communication services, one of which is the Internet. Similarly, U.S. Pat. No. 5,546,452 to Andrews et al. discloses an ACD controlled by a distributed central controller. However, neither Hollenbach et al. nor Andrews et al. appear to disclose an ACD with the capacity to service multimedia callers; only the agent stations have access to the Internet or wide-area networks. Unfortunately, therefore, neither Hollenbach et al. nor Andrews et al. solve the problem of allowing access to a multimedia ACD via data networks. Furthermore, neither Hollenbach et al. nor Andrews et al. teach or disclose the use of an MMACD Server as connection manager for data network callers.

U.S. Pat. No. 5,500,859 to Sharma et al. discloses a personal communications system operating on a personal computer which allows the user to select between different communications functions, including telephone call, voice mail, fax transmissions, and multimedia mail. Sharma et al., however, does not solve the problems of providing a multimedia telecommunication ACD system which allows access to the call center via a plurality of access means and providing an MMACD server to act as connection manager for callers.

U.S. Pat. No. 5,384,771 to Isidoro et al. discloses a multimedia call configuration system. Isidoro et al. uses an object oriented command set to establish a multimedia call over a broadband network. One command set relates to the call configuration and another to the connection configuration. Unfortunately, however, Isidoro et al. does not solve the problem of providing a multimedia telecommunication ACD system which allows access to the call center via a plurality of access means; rather, it is directed toward establishing communications between multiple specific parties and has no automatic call direction (ACD) capability at all.

U.S. Pat. No. 5,546,324 to Palmer et al. discloses a video conferencing system used over a data network to communicate among terminals of the network. However, Palmer et al. is only directed to transferring video and audio data. Unfortunately, Palmer et al. does not solve the problems of providing a multimedia telecommunication ACD system which allows access to the call center via a plurality of access means and providing a MMACD server to act as connection manager for callers. Rather, it is directed toward establishing communications between multiple specific parties and has not automatic call direction (ACD) capability at all.

U.S. Pat. No. 5,526,353 to Henley et al. discloses a system and method for communication of audio data over a packet-based network. Henley et al., however, does not solve the problems of providing a multimedia telecommunication ACD system which allows access to the call center via a plurality of access means and providing a MMACD server to act as connection manager for data network callers.

U.S. Pat. No. 5,241,625 to Epard et al. discloses a system for sharing screens over a heterogeneous network. Similarly, U.S. Pat. No. 5,473,680 to Porter discloses methods and apparatus for interfacing with application programs to manage multimedia multiparty communications using different hardware systems and devices. Neither Epard et al. nor Porter solve the problem of providing a multimedia telecommunication ACD system which allows access to the call center via a plurality of access means or a MMACD server acting as a connection manager for callers. Rather, they are directed toward establishing communications between multiple specific parties and have no automatic call direction (ACD) capability at all.

In view if the foregoing, there is a need, therefore, for a multimedia telecommunication ACD system which: allows access to the call center via a plurality of access means, including simultaneous voice, data, and video telephony; provides an MMACD server acting as a connection manager for data network callers; enables call agents to answer calls without the use of a telephone set; and ensures effective transparent spreading of agents over different geographical locations.

SUMMARY OF THE INVENTION

The present invention alleviates to a great extent the foregoing shortcomings by providing a multimedia telecommunication ACD system which allows access to the call center via a plurality of access means, including simultaneous voice, data, and video telephony, and at the same time ensures effective transparent spreading of agents over different geographical locations. The ACD system of the present invention uses an MMACD server acting as connection manager for data network callers and provides for automatic caller identification. It is thus an object of the present invention to implement a call center exchange by utilizing packet switching technology so that the same packet data backbone is shared for transport and routing of the calls as well as data.

It is a further object of the invention to provide videotelephony between a caller and a call center agent. This function is particularly valuable in instances where body language and creation of rapport is important to providing good service. Videotelephony makes it possible to demonstrate particular products or maintenance activities. Similarly, the call center agent can view the customer's activities and reactions.

It is a further object of the invention to provide screen and application sharing between the caller and the agent. Whenever a caller requires support with a software application, it is invaluable for the support agent to view the remote desktop. It is thus an object of the invention to provide this functionality as an integrated part of a multimedia call center.

It is a further object of the invention to provide the caller with an ability to reach multimedia information on-line and to transfer to a live agent or to leave an electronic or voice message.

It is a further object of the invention to provide intelligent routing and re-routing and queuing of calls to agents. Thus, the multimedia server should have the capability of routing calls to particular queues based on the type of call, the area of interest selected by the caller, the caller's identification, and other relevant criteria.

It is a further object of the invention to provide intelligent routing and queuing of messages to agents for processing.

It is a further object of the invention to integrate an Internet Customer Service Center as described above with a call center so a caller/customer arriving at an Internet site can transfer to a live or automated agent.

It is a further object of the invention to provide automatic caller identification for purposes of more efficient service, proper call routing, access verification, and billing. The conventional methods use ANI information obtained from the telephone company for these purposes or the caller is required to identify himself by entering his identification number by pressing the appropriate buttons on his telephone. While the present invention uses the above methods, it also identifies network callers by their network addresses (carried by the network protocol), and/or account identification numbers and passwords, and/or by encrypted electronic signatures.

It is yet another object of the invention to provide an ACD center where the agents may respond to multimedia calls by using a computer only.

Other objects and advantages of the present invention will be readily apparent from the following description and drawings which illustrate the present invention.

DETAILED DESCRIPTION OF PREFERRED EMBODIMENTS

Figure 1:
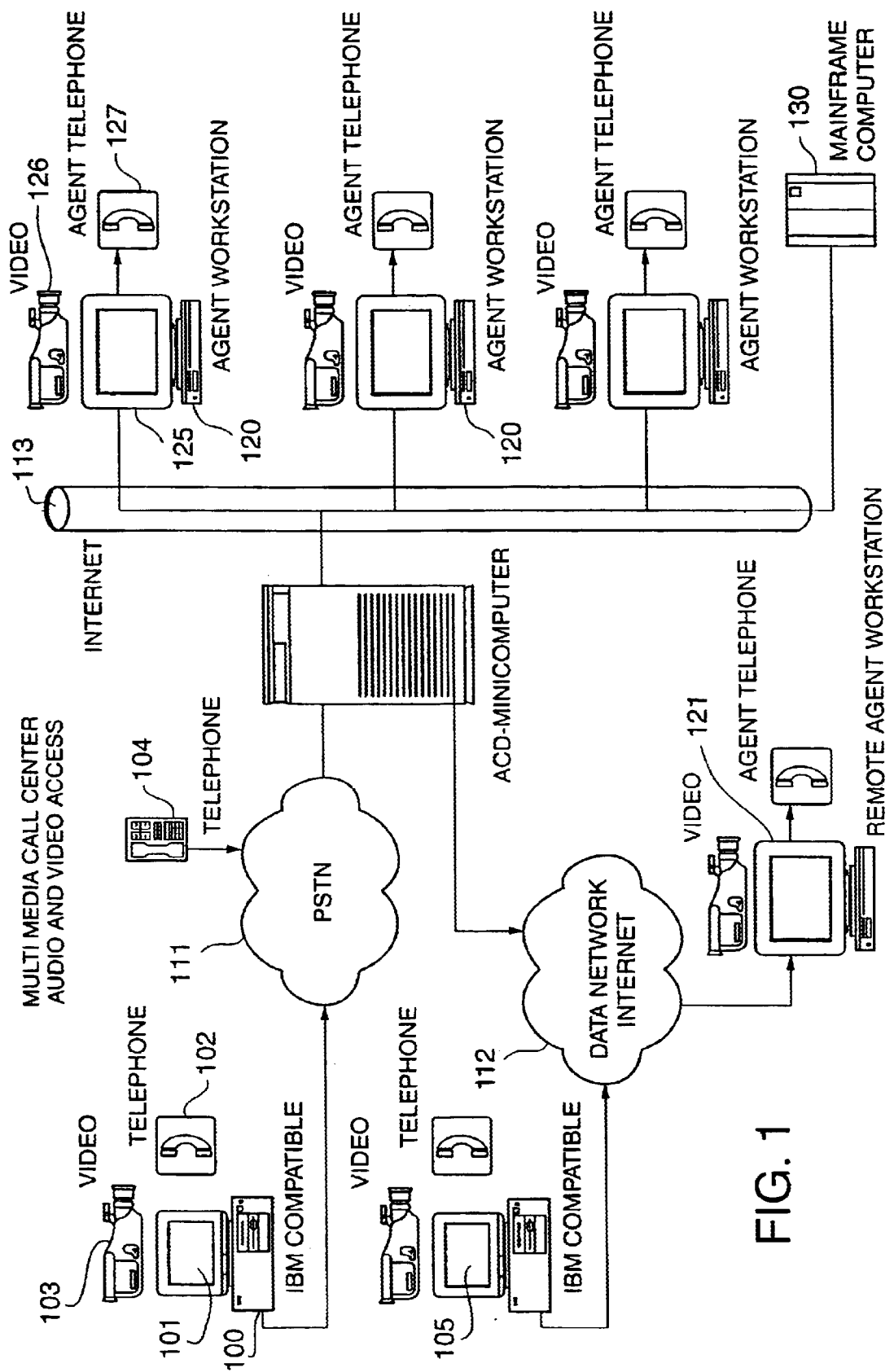
FIG. 1 is a block diagram illustrating the major subsystems of the present invention and their connection to a network.

Now referring to the drawings wherein like reference numerals refer to like elements, FIG. 1 illustrates the interconnection of the multimedia ACD main subsystems and their connection to the network. The present invention provides access to a call center via a plurality of access means. The access occurs through the PSTN or Private Branch Exchange ("PBX") and via plurality of data networks. PSTN access is possible through Plain Old Telephone ("POTS") lines, Digital Trunks and Integrated Services Digital Network ("ISDN") Basic Rate Interface ("BRI") or Primary Rate Interface ("PRI"). Data network access is available through a variety of channels. For example, Internet access is available utilizing a plurality of possible Department of Defense ("DOD") protocols such as User Datagram Protocol ("UDP"), the emerging Real Time Protocol ("RTP") and Resource Reservation Protocol ("RSVP"), or via frame relay or Asynchronous Transfer Mode ("ATM") protocol and networks. As shown in FIG. 1, cloud 111 represents the PSTN or PBX network, while cloud 112 represents the above mentioned data networks.

A plurality of callers represented by elements 100, 104, and 105 can access the MMACD server 110. A caller's identification is verified by the MMACD server 110 and the caller is then optionally presented with a menu of choices following which he is routed to a plurality of agents represented by elements 120 and 121. If no agent is available, the MMACD server places the caller on hold. While on hold, the caller continues to browse through information and receives information about how many callers are waiting in line in front of him and the average waiting time.

Routing algorithms, such as which caller will be routed to which agent or agent group, based on caller identity, and/or agent skills and/or call priority, are stored in and decided by the MMACD server 110. Alternatively, the MMACD server may query external databases for routing information. The MMACD server 110 provides appropriate administration tools to program such routing algorithms.

In case of PSTN audio only access by caller 104, the audio signal is converted by MMACD server 110 to digital information which is compressed and then packetized using protocols such as DOD Internet Protocol ("IP") specifications. For audio only access, the caller is presented by audio menus which he navigates by means of pressing buttons on his telephone set sending dual tone multi-frequency ("DTMF") tones. Navigation by means of voice recognition is also possible.

In case of data access via data network 112, ISDN, or a modem over PSTN 111, callers 101 and 105 can access the MMACD server 110 by means of a WWW browser such as Microsoft Internet Explorer or Netscape Communications Navigator™. MMACD server 110 comprises a WWW server such as the Microsoft IIS server. Upon connecting to MMACD 110, callers are presented with a WWW home page. Menus are implemented by the WWW pages. When an agent becomes available, the caller is directly connected to the agent utilizing standard data communication protocols, such as DOD IP. The MMACD server then acts as a connection manager by supplying to the caller's connection software the IP address of the available agent. The caller connection software is implemented as a plug-in module into the above-mentioned Microsoft browser or the Netscape Navigator, or may be downloaded as an application.

In the event the caller connection software is downloaded as an application, it is invoked from the browser as a result of a caller's wishing to connect to the MMACD of a call center. A network connection is established with the MMACD upon initiation of the caller connection software. The MMACD interacts with the caller connection software to provide the caller with status information (which may consist of text, graphics, audio, and video) on the call center, including information on the caller's predicted hold time. Additionally, this information may include advertisements and common problem solutions.

Once the MMACD has established a connection between a caller and an agent, the caller connection software is used to channel commands to the caller's telephony application. Commands such as call set up and termination, initiate and terminate chat, initiate and terminate white board, and initiate and terminate file transfer, are facilitated through the use of this connection software. The caller connection software also provides for remote control of the caller's browser. This facilitates the ability to perform collaborative browsing applications, allowing a two-way link between an agent and a caller to enable "walking" through specific problems. If the connection software is not available on the caller's computer, it is automatically downloaded and installed by the MMACD server 110.

Calls to local call agents 120 are routed over local area network ("LAN") 113. Calls to remote call agents 121 are routed via a data network 112, or a through direct data connection via ISDN (not illustrated).

Caller 105, accessing the center via data connection 112, may be connected to agents 120 and provided with a voice connection. Further, caller 105 will have the ability to share applications and screens with the agent utilizing protocols such as T.120 and to view the agent and his actions via agent camera 126.

In addition, callers equipped with video cameras 103 will also gain video access to agents 120, and a full video telephony session will be available together with all the communication means described above.

All agents 120 and 121 are equipped with work station computers 125, telephone headsets 127 and cameras 126. Additionally, all agents 120 and 121 have access to a database server 130. The database server 130 is accessed for purposes of running call center applications, storing and retrieving caller data, and providing information for the caller. MMACD server 110 also has access to the database server 130 for purposes of providing automated information via voice access, Interactive Voice Response ("IVR"), and/or data access via the WWW access.

The plurality of callers can be equipped by the following configurations:

Caller 104 is equipped with a telephone set only. This caller has audio only access to the center.

Caller 100 is equipped with a personal computer and an integrated telephone headset (or equivalent speaker and microphone 102). Caller 100 gains audio and data connection to the center via a modem or ISDN via PSTN utilizing protocols such as Point to Point Protocol ("PPP"). Optionally caller 100 may be equipped with video camera 103. In this case, caller 100 will also gain video access.

Caller 105 is similarly equipped, except he utilizes a different means of connection to data network 112, such as PPP over a modem connection or ISDN through direct hook-up to the network via a private line of a corporate backbone.

EXAMPLE OF OPERATION: ACCESS FROM COMPUTER EQUIPPED WITH MULTIMEDIA AND CAMERA

Callers 100 and 105 equipped with computer 101, an integrated telephone headset 102 and videocamera 103, access MMACD 110 either via a modem and PSTN 111 or via data network 112. When a call is answered by MMACD 110, a graphical access screen is displayed on the caller's computer. If possible, the caller's identity is determined from a data protocol or from a packet originating address, or if available, from authentication information carried by a protocol. The caller may further be asked to type his name and password. The caller then is requested to select a service and/or area of interest. An agent and/or agents or groups of agents are selected based on the caller identification and service and/or area of interest. If an agent is available to answer the call, the caller's data is sent via LAN 113 or data network 112 to agent workstations 120 or 121. A virtual data link is established between the caller and the agent. This link carries packets of multimedia content comprising voice, text, images, and video between callers 100 or 105 and agents 120 or 121. The caller and the agent can talk to each other, share screens, applications, and view each other and objects to which cameras 103 and 126 are directed.

If an agent is not available, the call is placed in an appropriate wait queue, based on caller priority, type of service and/or area selected, or access priority. The caller is notified of the current average queue wait time, the number of callers ahead of him, and other relevant information. The caller is also presented with an option to browse multimedia information recorded on MMACD server 110 or other servers in the network. Once an agent 121 serving the appropriate queue becomes available, the caller is transferred via data network 112 to agent 121. If the caller selects not to wait for an agent or browse through the information, he may leave a multimedia (voice, text, or voice and image) message that will be later handled by an available agent.

EXAMPLE OF OPERATION: ACCESS FROM COMPUTER NOT EQUIPPED WITH CAMERA

Callers 100 and 105 equipped with a computer aid integrated telephone headset, but not equipped with camera will be provided with all the functionality in the above example, with the exception that they will be able only to watch video and image information.

EXAMPLE OF OPERATION: ACCESS FROM TELEPHONE SET

Caller 104 makes a telephone call via PSTN 111 to the call center main telephone number. The call may arrive either via an analog telephone line or digital trunk. The call is answered by MMACD server 110. The caller hears voice prompts generated by the MMACD server 110 software, directing him to enter his identification, which is verified against a stored table. The caller may enter his identification using his telephone DTMF dial pad. The caller is further asked to select from the menu an area of interest. An agent or group of agents is selected based on caller identification and area of interest. If an agent is available to answer the call, the caller's data is sent via LAN 113 or data network 112 to agent workstation 120 or 121. An audio path is then created between the caller and the agent by converting PSTN audio representation to compressed network packet format and transmitting the packets via LAN 113 or data network 112. Similarly, audio data packets arriving from agents 120 or 121 are converted to either analog or digital Pulse Code Modulation ("PCM") telephone formats. If an agent is not available, the call is placed in an appropriate wait queue based on caller priority, type of service, area of interest, or access priority. The caller is notified of the current average queue wait time, the number of callers ahead of him, and other relevant information. The caller is presented with the option to browse audio information recorded on the MMACD server 110. Once an agent 121 serving an appropriate queue becomes available, the caller is transferred via data network 112 to agent 121. If the caller selects not to wait for an agent or browse through the information, he may leave a voice message that will be later handled by an available agent.

Figure 2:
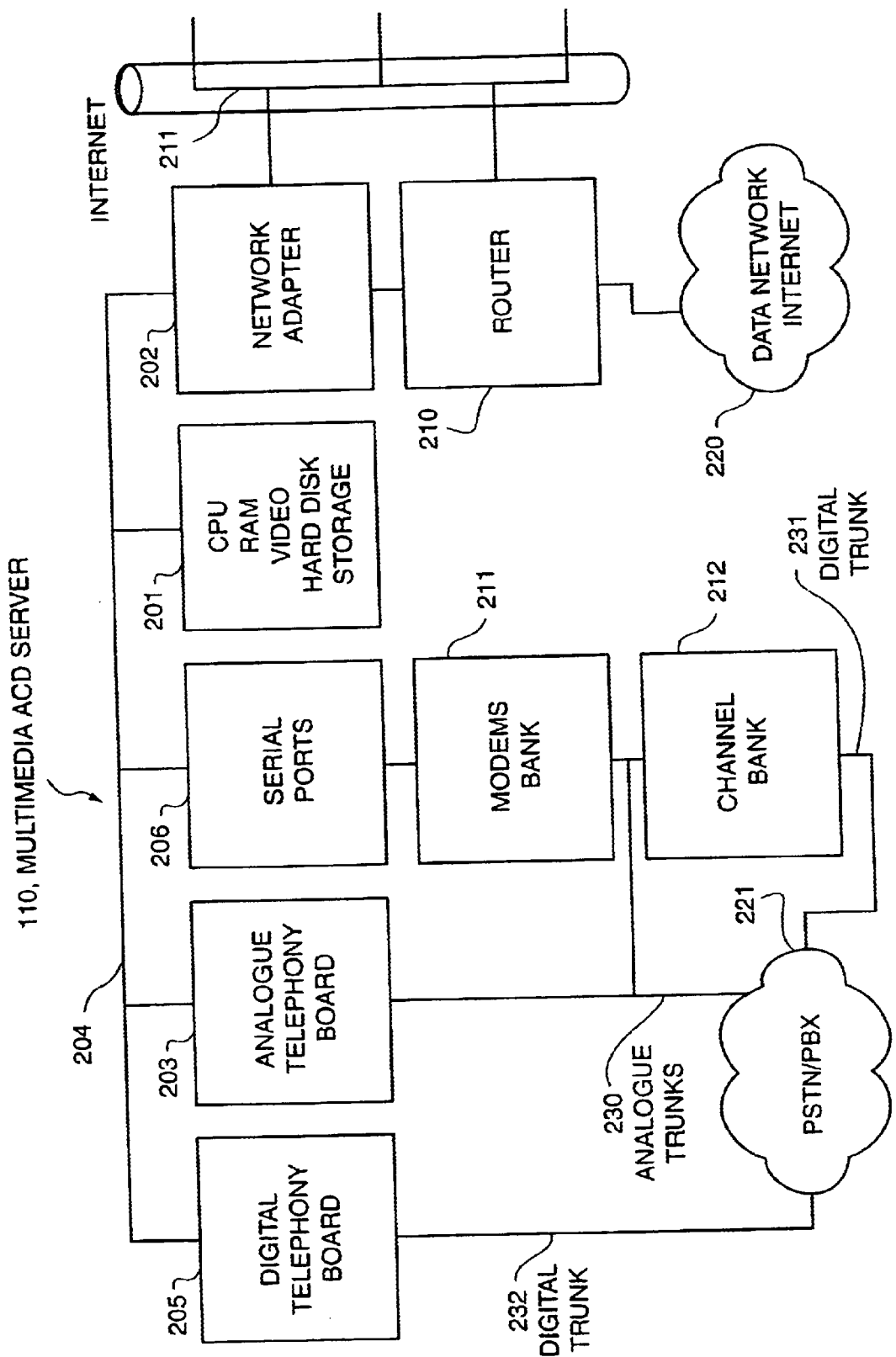
FIG. 2 is a block diagram illustrating the major components of the MMACD server 110 of FIG. 1.

FIG. 2 illustrates the main building blocks of the MMACD server illustrated as element 110 in FIG. 1. The MMACD server is based on a standard IBM-compatible Pentium or other comparable computer 201. Standard parts of computer 201 are a central processing unit ("CPU"), 32 Mbytes random access memory ("RAM"), a video card, and 1.2 Gbytes of Hard Disk storage. The MMACD operates on a Microsoft NT 3.51 Windows NT Advance Server operating system.

The CPU communicates with a network adapter 202 such as an Intel EtherExpress 16TP via the bus 204. Network adapter 202 connects to an Ethernet backbone 211 (depicted as element 113 in FIG. 1) which carries all administration data as well as relevant multimedia information. Ethernet backbone 211 connects to an outside data network 220 such as the Internet, via router 210. An example of the router is the Cisco 500 CS. The router 210 is required for isolation of the server's internal network from outside influences.

Via bus 204, the CPU also communicates with an analog telephone board 203 such as the Dialogic D41ESC or digital telephone board such as the Dialogic D/240SC-T 1205 which interfaces to PSTN or PBX via analog trunks 230 or digital trunks 232, respectively.

Audio traffic arriving from PSTN is digitized by telephony board 203 and converted to a digital format such as Adaptive Differential Pulse Code Modulation ("ADPCM"). The digital signal is forwarded to CPU 201 for processing. CPU 201 packetizes the voice signals and places the voice packets on the Ethernet backbone 211 addressed to an appropriate agent. Audio signals generated by the agents are sent via Ethernet backbone 211 to CPU 201 and forwarded to telephony board 203 where it is converted to analog or PCM formats in compliance with PSTN protocols.

Modem multimedia data traffic arriving via PSTN and analog trunks 230 is routed to telephony board 203 for detection of the type of call. If recognized as a modem call, the CPU instructs an appropriate modem in modem bank 211 to accept the call utilizing PPP or Serial Line Internet Protocol ("SLIP"). Modem bank 211 contains a plurality of modems such as AT&T Dataport. In the event of a PSTN connection via digital trunk 231, a channel bank 212 such as Newbridge Mainstreet A4 channel bank, is required to convert from digital to analog format. All services available to callers calling via data network 220 are also available to callers calling via modem bank 211.

Multimedia data traffic may also arrive via PSTN over ISDN trunks. This traffic is routed to Digital Telephony Board 205 capable of T1 (Digital Transmission Link with capacity of 1.544 Mbps) or ISDN PRI access.

Figure 3:
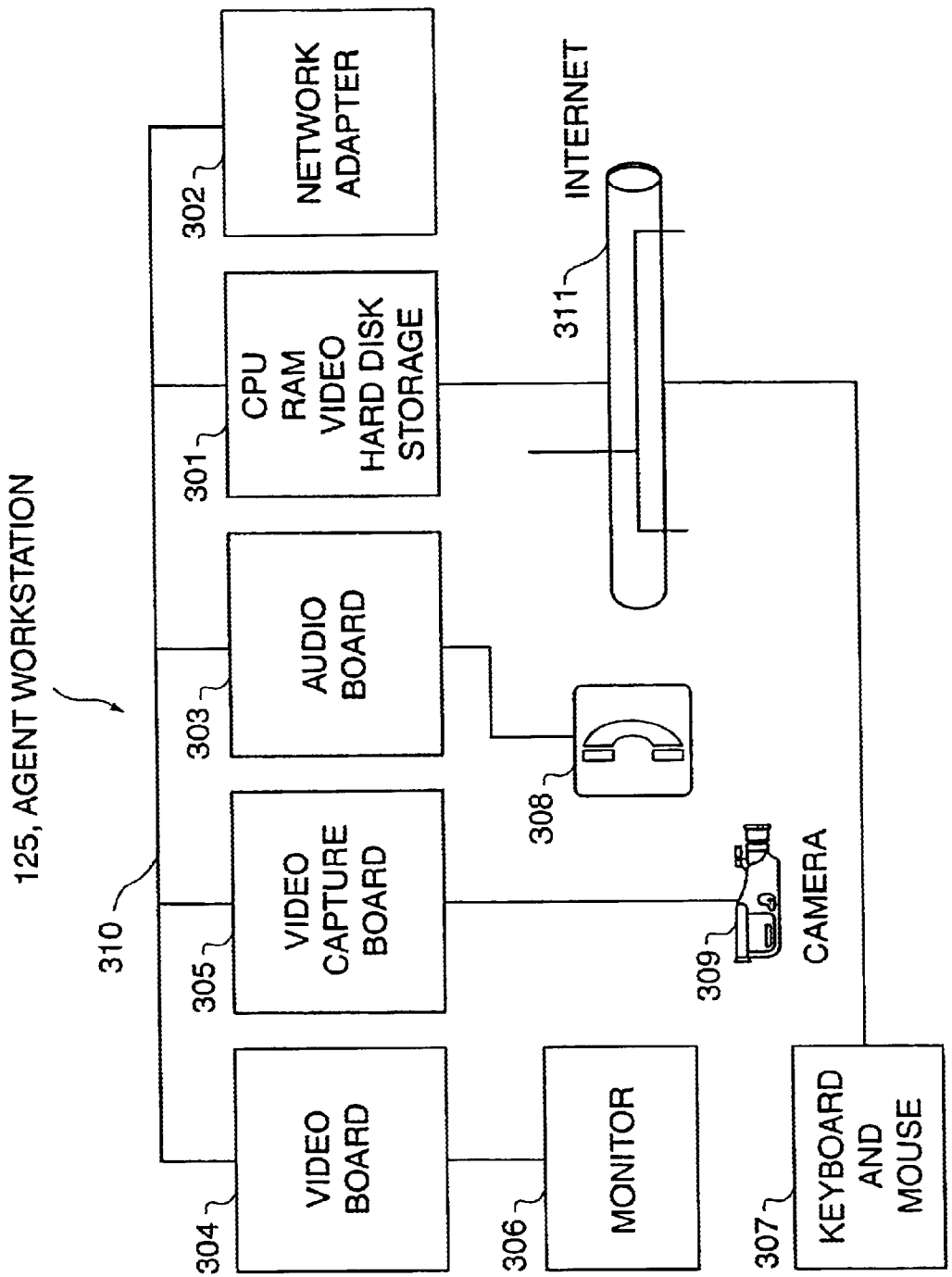
FIG. 3 is a block diagram illustrating the major components of a typical agent workstation.

FIG. 3 illustrates the main building blocks of an Agent Work Station ("AWS") illustrated as element 120 in FIG. 1. AWS is based on a standard IBM compatible Pentium or other comparable computer 301. Standard parts of computer 301 are the CPU, 16 Mbytes of RAM, a video card, and 1 Gbyte of hard drive storage. The workstation operates on Windows 95 or other comparable operating systems.

The CPU communicates via bus 310 with network adapter 302 such as the Intel EtherExpress 16TP. Network adapter 302 connects to Ethernet backbone 311, illustrated as element 113 in FIG. 1, which carries all administration data as well as relevant multimedia information.

Voice traffic is sent to audio-board 303 (such as the Acer S23) which connects to the telephone headset (or speaker and microphone) 308. The audio-board translates the digitized audio to an analog signal utilizing industry standard codecs such as Microsoft PCM, ADPCM or Group Special Mobile ("GSM") compression algorithm by the European Telecommunication Standards Institute, which are then played via the speaker of headset 308. Similarly, analog audio generated by the microphone of headset 308 is converted by the audio-board to a digital format utilizing, for example, the above-mentioned codecs. The resulting digital signal is packetized by computer 301 and forwarded to network adapter 302 to be sent to a caller. As an option, the outgoing signal can be modified by digital signal processing means utilizing voice morphing techniques to modify an agent's voice.

Video traffic is routed to video capture board 305, such as Creative Labs Video Blaster SE100, where the data is decoded utilizing industry standard codecs such as Crystal Net SFM Codec (32) or NSVide™ V2.1 Gray 8-bit included with a package such as Connectix VideoPhone for display on monitor 306. Similarly, video arriving from camera 309 is encoded, for example, by the above-mentioned codecs. Video data can consist of information such as caller and/or agent images or images of objects of interest that the caller and/or agent put in front of a camera. As an option, the outgoing video signal can be modified by digital signal processing means utilizing image morphing techniques to modify an agent's image.

Standard video monitor 306, such as Samsung SyncMaster 17GLS, is used to display information about callers, wait queues, and database information related to the respective service to be provided by the agent to the caller. If the call is made from a computer, the agent can view the caller's computer screen. In the event a call is made from a terminal equipped with a camera, the agent can view the caller's image. All the information above appears in separate windows, which can be arranged by the agent according to his preferences. Keyboard and mouse 307, such as standard Microsoft keyboard and mouse, are used as input devices.

Figure 4:
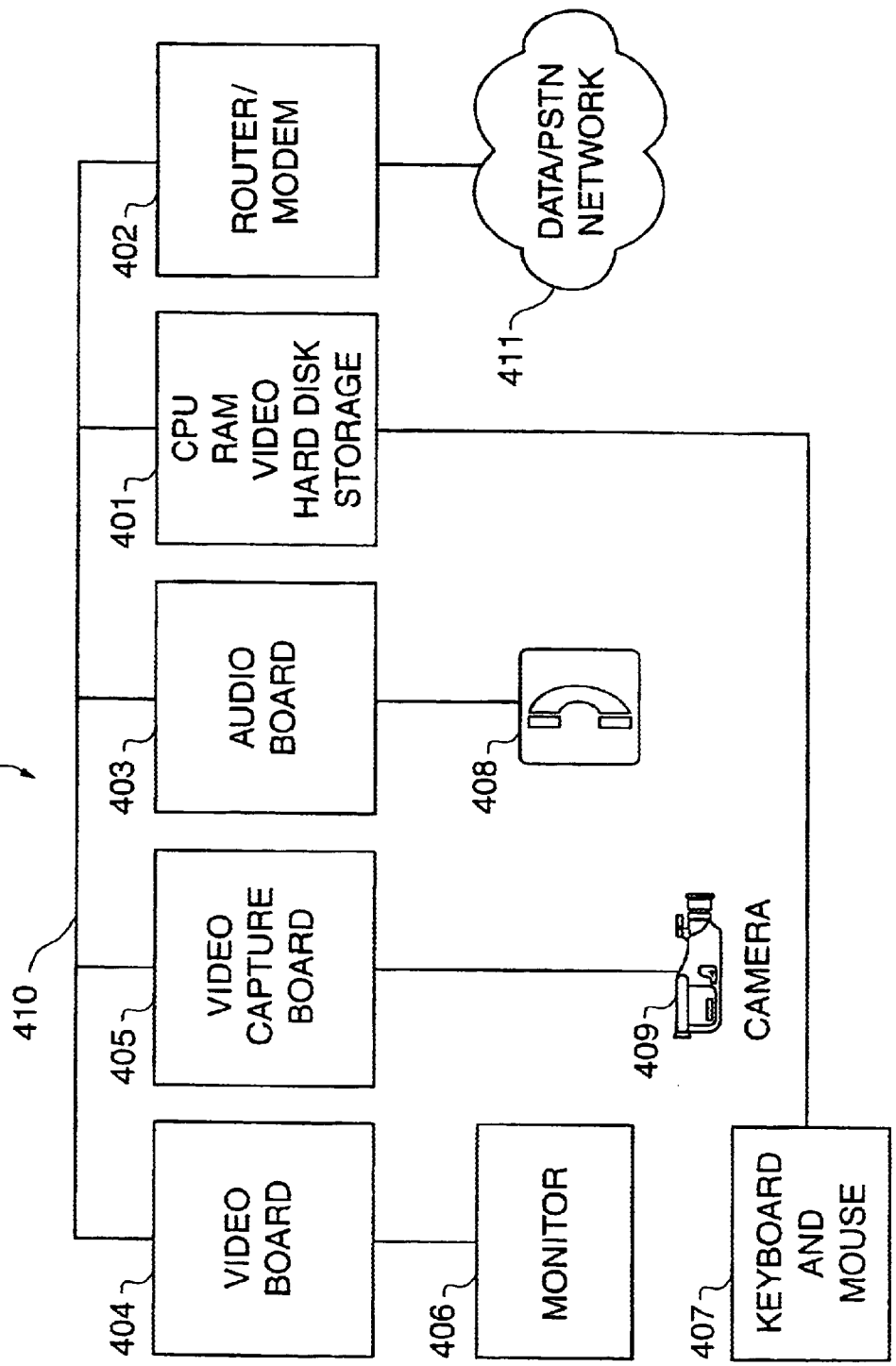
FIG. 4 is a block diagram illustrating the major components of a typical remote agent workstation 125 shown in FIG. 1.

FIG. 4 illustrates the main building blocks of a Remote Agent Work Station ("RAWS"). This workstation is essentially the same as a local AWS, except that the RAWS connects to a data network 411 rather than to the AWS Ethernet backbone, which is illustrated as 311 in FIG. 3.

Figure 5:
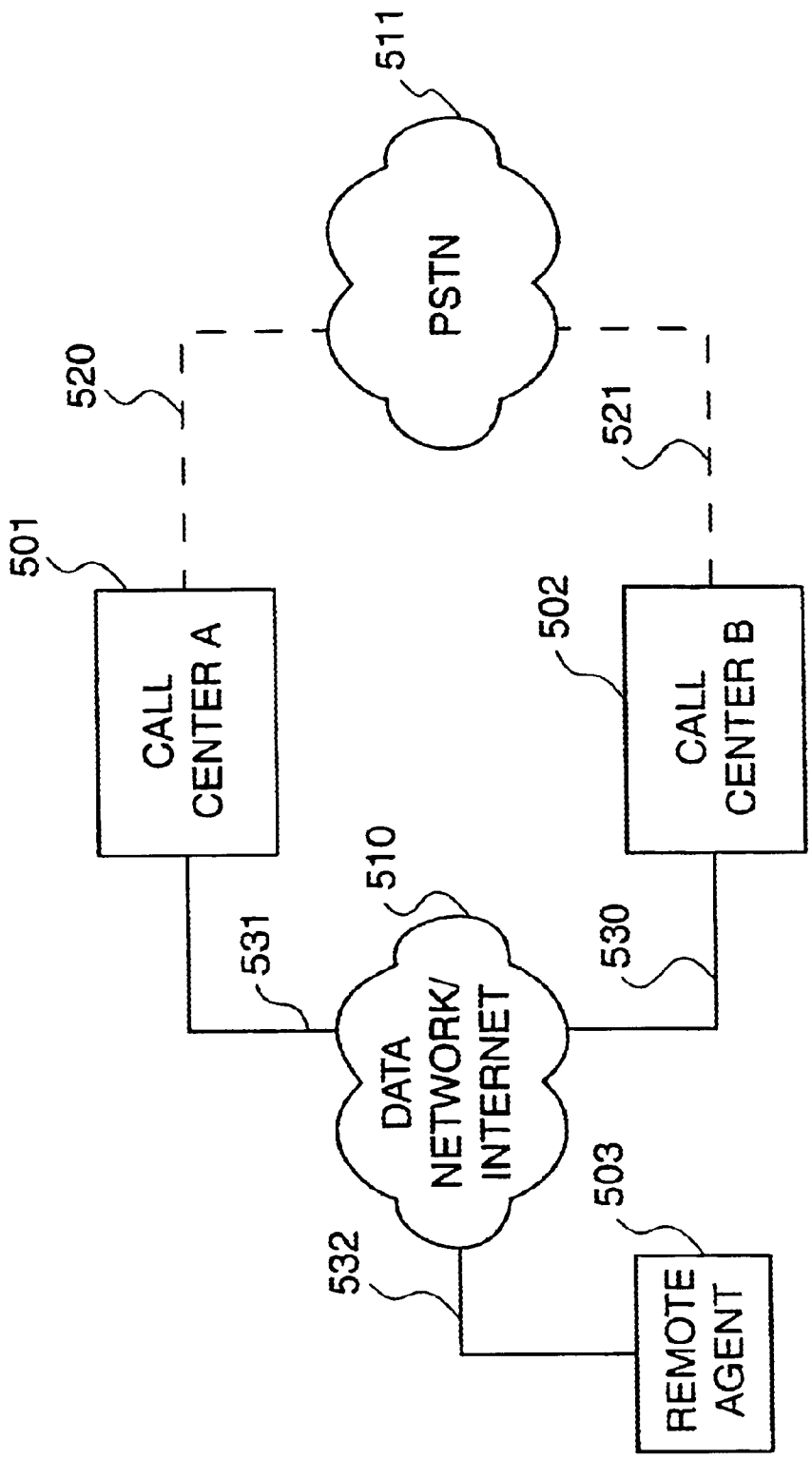
FIG. 5 is a block diagram illustrating the interconnection of a distributed call center.

FIG. 5 illustrates a distributed multimedia call center. A distributed call center consists of a plurality of geographically distributed self-contained multimedia call centers A and B illustrated as elements 501 and 502. Call centers 501 and 502 connect to PSTN 511 via central office ("CO") trunks 520 and 521, respectively. Call centers 501 and 502 also connect to a data network 510, such as Internet, via data connections 530 and 531, respectively. Remote agents 503 are also connected to the data network 510.

Calls arriving from telephone callers via PSTN 511 to call center 501, for example, are converted to compressed digital representation and then handled locally or transmitted via data network 510 to another call center, for example call center 502, or to remote agent 503. Audio signals generated by remote agent 503 or remote call center 502 are sent via data network 510 to the originating call center 501 and are converted to a PSTN-compatible signal back to the caller. The above-mentioned method is used in the case a PSTN transfer is not economical. In the event the two call centers are in the same calling area, call transfer is conducted via PSTN 511 and audio signals generated by remote agent 503 or remote call center 502 are transferred to the originating call center 501 via PSTN 511.

Multimedia calls arriving via data network 510 are routed to one of the call centers, for example call center 501, and are either handled by that center or forwarded to another call center, for example 502, or to a remote agent 503. Two types of transfer modes are possible. Method A, involves packets being readdressed and dispatched to their destination. Method B, if supported by the caller's software, involves the caller being directly reconnected to the new destination. Under method A, data packets arriving from the caller are re-addressed, but packets generated by any center or agent are sent directly to the caller. Under method B, all packets are transmitted and received directly by the parties.

Distributed call centers 501 and 502 and remote agents 503 have the ability to share databases and other call center administration data.

Figure 6:
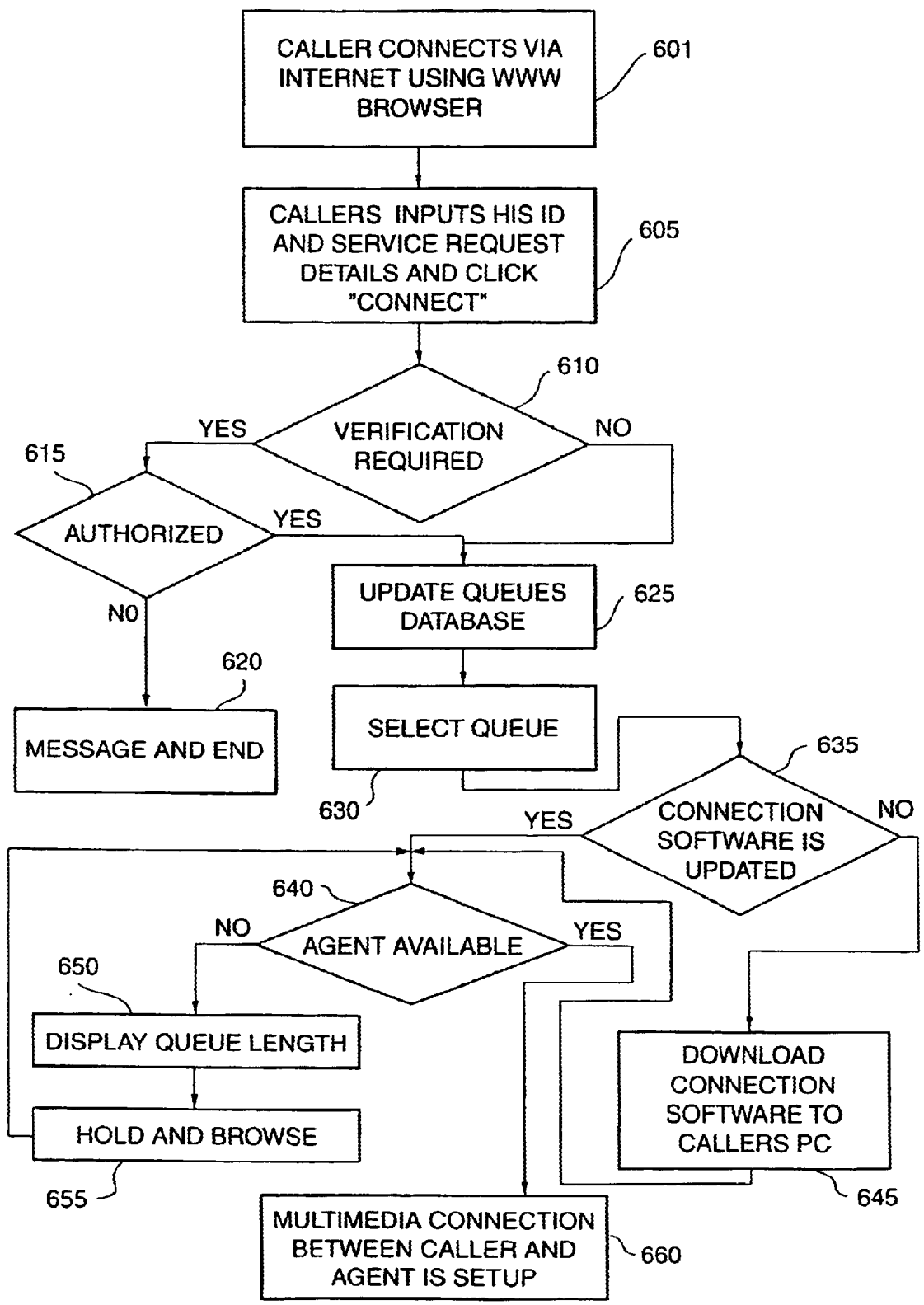
FIG. 6 is a flowchart illustrating method of access to a call center from the Internet.

FIG. 6 illustrates a typical method of access to a call center by means of the Internet. At step 601, a caller connects to the Internet by means of WWW browser software and accesses a call center web page. The caller types in identification, service request information and presses or clicks requesting connection to a call center Agent as illustrated in step 605. If identification verification is required as in 610, access authorization is checked in 615. If the caller is not authorized to access the call center, an appropriate message denying access is displayed and the caller is disconnected, as illustrated in step 620. If the caller is authorized in 615, the call is handled at step 625. If verification is not required at step 610, the call immediately proceeds to step 625. At step 625, the call center queues database is updated with the information transmitted from the WWW page in 605. At step 630, the caller's identification and requested services information is analyzed and the caller is placed in an appropriate wait queue. The caller's computer communicates with the call center via connection software, configured as a browser helper module. Step 635 checks whether this connection software exists on the caller's computer and whether it is updated. If not, step 645 involves downloading this software or an update, to the caller's computer. If the software exists at step 635 or after it is downloaded at step 645, step 640 checks for the availability of an agent in the appropriate queue. If an agent is not available at step 640, wait information, such as the length of the queue and expected wait time, are displayed on the caller's computer at step 650. At step 655, the caller is placed on hold while waiting for an available agent. While holding, the caller can browse through information and screens available to him at the call center WWW site or the global Internet.

While holding at step 655, the caller can also chat via text, voice, or voice and video with other callers on hold. Step 640 involves periodic checking whether an agent becomes available, and queue information is periodically updated in 650. Once it is determined in 640 that an agent is available, the caller is connected to that agent at 660. The connection can be voice, voice and data, or voice, video and data connection.

Figure 7:
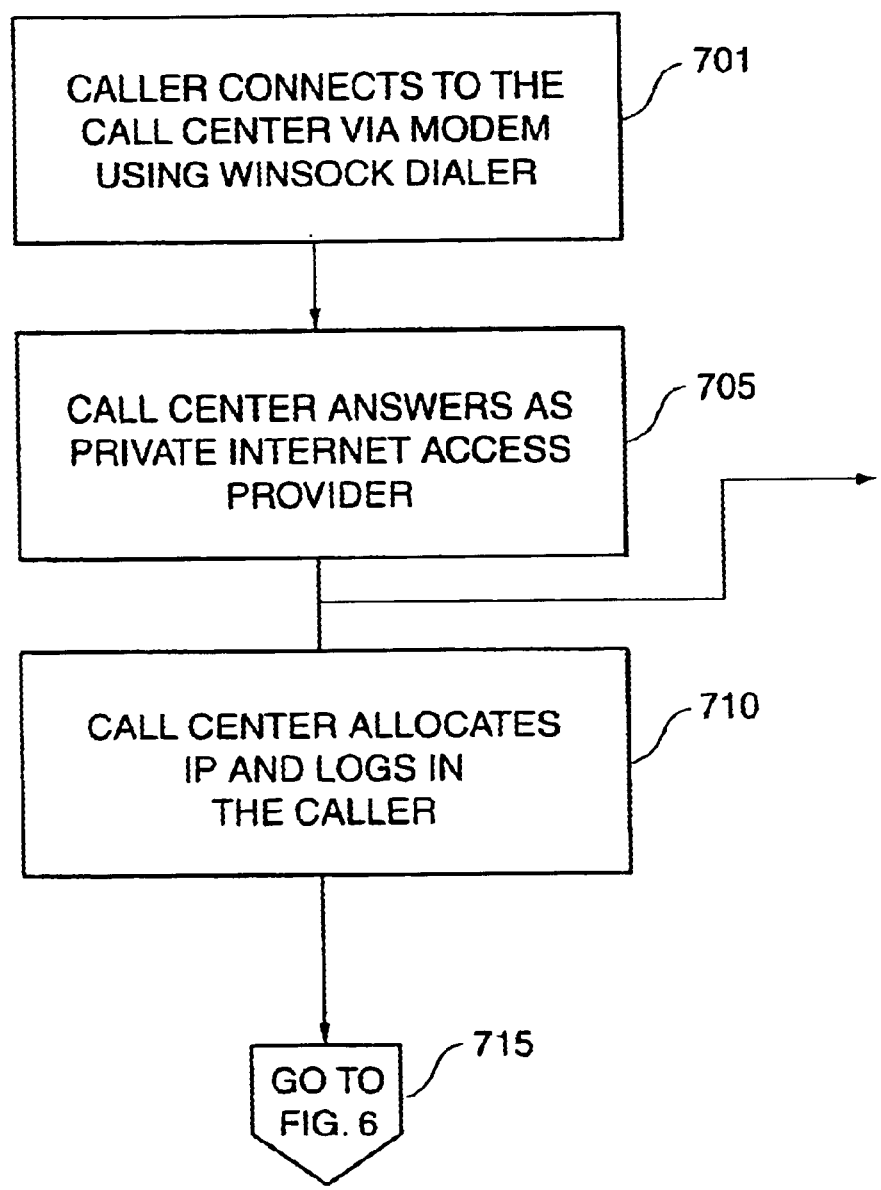
FIG. 7 is a flowchart illustrating a method of accessing a call center by means of a modem.

FIG. 7 illustrates access to a call center by means of a modem. The caller in step 701 makes a connection using a Winsock Transmission Control Protocol/Interent Protocol ("TCP/IP") dialer or another dial up software to call into the call center via a modem. In 705 the call center provides access to its internal network as a private Internet access provider. The caller does not need to have an Internet account. In 710, an IP address is allocated to the caller and he is logged on the network. At step 715, the caller continues according to the method as described in FIG. 6.

The above description and drawings are only illustrative of the preferred embodiments that achieve the objects, features, and advantages of the present invention and it is not intended that the present invention is limited thereto. Any modifications of the present invention which come within the spirit and scope of the following claims are considered part of the present invention.

What is claimed is:

1. A method for distributing telephone calls comprising the steps of:

receiving a telephone call from a caller in at least one server connected to an Internet Protocol network;

obtaining data corresponding to the caller, the data including an interest of the caller;

automatically determining at least one destination for said telephone call from a plurality of geographically distributed destinations matching the data including the interest of the caller;

converting said telephone call into Internet Protocol compatible packet data;

assigning an available destination of said at least one destination over said Internet Protocol network; and sending said packet data to the available destination over said Internet Protocol network.

2. The method of claim 1, wherein said step of converting said telephone call to said Internet Protocol session comprises the steps of:

packetizing said telephone call into packets;

assigning an Internet Protocol address, as the available destination of said packets, to said telephone call.

3. The method of claim 1, wherein said step of converting said telephone call into said Internet Protocol session comprises the steps of:

compressing said telephone call;

packetizing said telephone call into packets; and assigning an Internet Protocol address, as the available destination of said packets, to said telephone call.

4. The method of claim 1, wherein said step of converting said telephone call into said Internet Protocol session comprises the steps of:

digitizing said telephone call;

compressing said telephone call;

packetizing said telephone call into packets; and assigning an Internet Protocol address, as the available destination of said packets, to said telephone call.

5. The method of claim 1, further comprising the steps of:

initiating a response to said telephone call in said available destination;

sending said response as an Internet Protocol session to said server connected to said Internet Protocol network;

converting said response into a format compatible with said telephone call; and sending said response to said caller via said telephone call.

6. A method for processing electronic messages in a telecommunication call distribution center comprising the steps of:

receiving an electronic message from a caller in at least one server connected to an Internet Protocol network;

obtaining data corresponding to the caller, the data including an interest of the caller;

automatically determining at least one destination for said electronic message from a plurality of geographically distributed destinations matching the data including the interest of the caller;

assigning an available destination of said at least one destination over said Internet Protocol network; and sending said electronic message to the available destination over said Internet Protocol network.

7. A method for processing multimedia telecommunication calls comprising the steps of:

receiving a call sent by a caller in at least one server connected to an Internet Protocol network;

obtaining data corresponding to the caller, the data including an interest of the caller;

automatically determining at least one destination for said call from a plurality of geographically distributed destinations matching the data including the interest of the caller;

identifying the source and type of said call;

assigning an available destination of said at least one destination over said Internet Protocol network; and sending said call to the available destination over said Internet Protocol network.

8. The method of claim 7, wherein said step of identifying the source and type of said call comprises the steps of:

identifying whether the source is a telephone network or an Internet Protocol call; and identifying whether said call type is live or message.

9. The method of claim 8 further comprising the step of converting said call into an Internet Protocol session.

10. The method of claim 9, wherein said step of converting said call into said Internet Protocol session comprises the steps of:

packetizing said call into packets;

assigning an Internet Protocol address, as the available destination of said packets, to said call.

11. The method of claim 9, wherein said step of converting said call into said Internet Protocol session comprises the steps of:

compressing said call;

packetizing said call into packets; and assigning an Internet Protocol address, as the available destination of said packets, to said call.

12. The method of claim 9, wherein said step of converting said call into said Internet Protocol session comprises the steps of:

digitizing said call;

compressing said call;

packetizing said call into packets; and assigning an Internet Protocol address, as the available destination of said packets, to said call.

13. The method of claim 8, further comprising the steps of:

initiating a response to said call in said available destination;

sending said response as an Internet Protocol session to said server connected to said Internet Protocol network;

converting said response into one of an analogue and digital format compatible with said telephone call in said server connected to said Internet Protocol, wherein said source is identified as a telephone network; and sending said response to said caller.

14. The method according to claim 13, wherein at least one of said call and said response includes at least one of voice signals and video signals, and wherein the step of converting between analog voice signals and IP protocol voice data is performed in at least one of a processor operated by said caller and a processor associated with said available destination.

15. The method of claim 8, further comprising the step of selectably remotely controlling at least one of a web browser, file transfer software and a telephony application operating on a processor operated by the caller by a processor associated with the available destination, wherein the source is identified as an Internet Protocol call.

16. The method according to claim 8, further comprising the step of allocating an IP address to the caller wherein said source is an Internet Protocol call.

17. The method of claim 7, further comprising the step of:

waiting for one of said at least one destinations to become available for receiving said call; and placing said call in a wait queue for subsequent distribution to a first destination of said at least one destinations to become available.

18. The method of claim 17 further comprising the step of:

assigning a priority value for use by said wait queue.

19. The method of claim 17, wherein said step of identifying the source and type of said call comprises the step of identifying whether the source is a telephone network or an Internet protocol call; and further comprising the step of providing the caller of said call in said wait queue with access to multimedia content, wherein said access includes browsing the Internet Protocol network and web pages provided by the server connected to said Internet Protocol network, and wherein the source of said call is identified to be an IP protocol call.

20. The method of claim 19, wherein said access to multimedia content is provided over a web server connected to said Internet Protocol network.

21. The method according to claim 17, further comprising the step of providing chat capabilities via at least one of text, voice and video for said caller while waiting on said wait queue with other callers waiting on one of said queue or another queue of said server connected to said Internet Protocol network, wherein said source is an Internet Protocol call.

22. The method of claim 7 further comprising the step of:

providing said caller of said call with multimedia content that comprises wait time information.

23. The method of claim 7, further comprising the step of sending an IP address of said available destination to said caller.

24. The method of claim 7, further comprising the steps of accessing stored data corresponding to said caller in said server and said available destination.

25. The method of claim 7, wherein said server is capable of interfacing only with a data network when processing said call.

* * * * *